United States Patent [19]

Betts

[11] Patent Number: 4,990,940
[45] Date of Patent: Feb. 5, 1991

[54] DISENGAGEMENT AND RETRIEVAL MECHANISM FOR A RECORD

[75] Inventor: John Betts, Modesto, Calif.
[73] Assignee: Deltatrak, Inc., Modesto, Calif.
[21] Appl. No.: 422,781
[22] Filed: Oct. 17, 1989
[51] Int. Cl.$^5$ ............................................. G01D 15/00
[52] U.S. Cl. ............................... 346/145; 346/33 TP; 346/136
[58] Field of Search ..................... 346/33 TP, 145, 136

[56] References Cited

U.S. PATENT DOCUMENTS

| 4,007,637 | 2/1977 | Nakagawa et al. | 346/136 |
| 4,044,362 | 8/1977 | Greenhut | 346/136 |
| 4,222,061 | 9/1980 | Stires, III | 346/136 |
| 4,755,063 | 7/1988 | Nakagawa et al. | 346/33 TP |

FOREIGN PATENT DOCUMENTS

| 0312549 | 3/1956 | Fed. Rep. of Germany | 346/145 |
| 0095820 | 7/1980 | Japan | 346/145 |

Primary Examiner—Bruce A. Reynolds
Assistant Examiner—Huan Tran
Attorney, Agent, or Firm—Bielen, Peterson & Lampe

[57] ABSTRACT

A mechanism for obtaining a strip record of an environmental measurement. The mechanism is used in conjunction with a clock drive which advances a recording strip and with a stylus which marks an indication of the environmental status on the recording strip. The mechanism includes a housing having an exterior and interior portion which encloses the marking stylus. The recording strip is supported by a holder to permit marking by the stylus. An element is connected to the recording strip and fixed relative to the housing for permitting marking of the recording strip by the stylus. The element is removed from the housing by movement away from the marking stylus.

6 Claims, 2 Drawing Sheets

DISENGAGEMENT AND RETRIEVAL MECHANISM FOR A RECORD

BACKGROUND OF THE INVENTION

The present invention relates to a novel mechanism for the disengagement and retrieval of a strip record representing a measurement of an environmental condition.

Strip chart recorders have been used extensively in cargo containers, intended to transport items over land, sea, or through the air, to record environmental conditions such as temperature, pressure, humidity, and the like. Continuous or strip chart recorders in the past have been quite expensive and have been difficult to load and unload. The latter disadvantage often causes damage to portions of the strip chart recorder such as the stylus or gear mechanism.

U.S. Pat. Nos. 4,222,061 and 4,044,362 show portable strip chart recorders which require opening of the housing of the instrument to load and unload the recording strip which is formed on a cartridge. A slip clutch is required to disengage the gear mechanism of the cartridge.

U.S. Pat. No. 4,007,637 describes a disposable-type temperature recorder which employs a stylus and a clock drive. The tape having the recorded temperatures is removed by unwinding the same from the take-up spool and the remainder of the recorder is discarded.

A strip chart recorder which enjoys the economy and convenience of a disposable-type recorder yet is reusable would be a great advance in the instrument field.

SUMMARY OF THE INVENTION

In accordance with the present invention a novel and useful mechanism for disengagement and retrieval of a strip record is provided.

The mechanism of the present invention utilizes a housing having an interior and an exterior portion. The housing encloses a stylus, clock drive, and strip source such as a rolled recording strip.

The recording strip is marked by the stylus which indicates a measurement of temperature pressure, humidity or the like. The marked recording strip then moves to a holder for the same which may be in the form of take-up roll. Such roll is linked to the clock drive, for example, by meshingly engaging gears.

The recording strip holder is connected to an element or plate. Means is also provided for fixing the element relative to the housing such that the connected recording strip holder lies at the interior portion of the housing. In such a position, the recording strip is marked by the stylus and advanced by the clock drive found at the interior of the housing. The plate element connected to the recording strip holder forms a portion of the housing. Means is also included for sealing the plate or element to the housing by providing an aperture through the plate usable by a conventional seal.

A guide is also included within the housing for positioning the recording strip relative to the stylus therewithin. Such guide is connected to the element or plate and lies intermediate the recording strip source and the holder or take-up roll for the recording strip.

The present invention is also defined to possess means for removing the element and connected recording strip holder relative to the housing by movement away from the stylus. Movement in this direction prevents damage to the stylus, interrupts the marking of the chart strip, and also permits the recording strip holder or roller to disengage the clock drive simply and easily. It should be noted that the recording strip may then be quickly removed from the holder or take-up roller and analyzed as required. The element may then be reconnected to the housing for reuse with a fresh unmarked recording strip which would be loaded within the housing.

It may be apparent that a novel and useful mechanism for the disengagement and retrieval and recording strip has been described.

It is therefor and object of the present invention to provide a mechanism for the disengagement and retrieval of a strip record which obviates any damage to a marking stylus or any other components within a strip recording device.

It is another object of the present invention to provide a mechanism for the disengagement and retrieval of a strip record which efficiently disengages the take-up mechanism from a clock drive without the need for a clutch apparatus.

It is another object of the present invention of the present invention to provide a mechanism for the disengagement and retrieval of a strip record which is simple and relatively inexpensive to manufacture.

A further object of the present invention is to provide a mechanism for the disengagement and retrieval of a strip record which may be easily sealed to prevent tampering of such strip record and is reusable or expendable at the option of the user.

Yet another object of the present invention is to provide a mechanism for the disengagement and retrieval of a strip record which contains a minimum of movable parts and is thus extremely reliable.

The invention possesses other objects and advantages especially as concerns particular characteristics and features thereof which will become apparent as the specification continues.

For a better understanding of the invention reference is made to the following detailed description of the preferred embodiments thereof which should be referenced to the heretofore described drawings.

DESCRIPTION OF THE PREFERRED EMBODIMENTS

Various aspects of the present invention will evolve from the following detailed description of the preferred embodiments which should be taken in conjunction with the prior described drawings.

Figure 2:
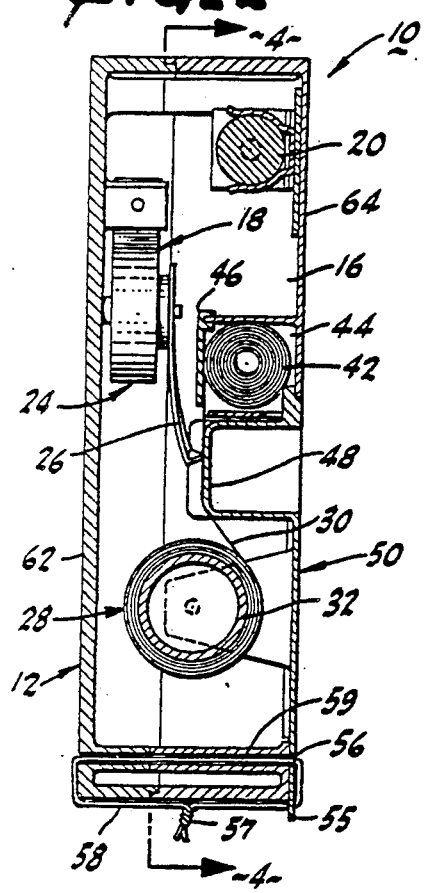
FIG. 2 is a sectional view taken along line 2—2 of FIG. 1.
Figure 4:
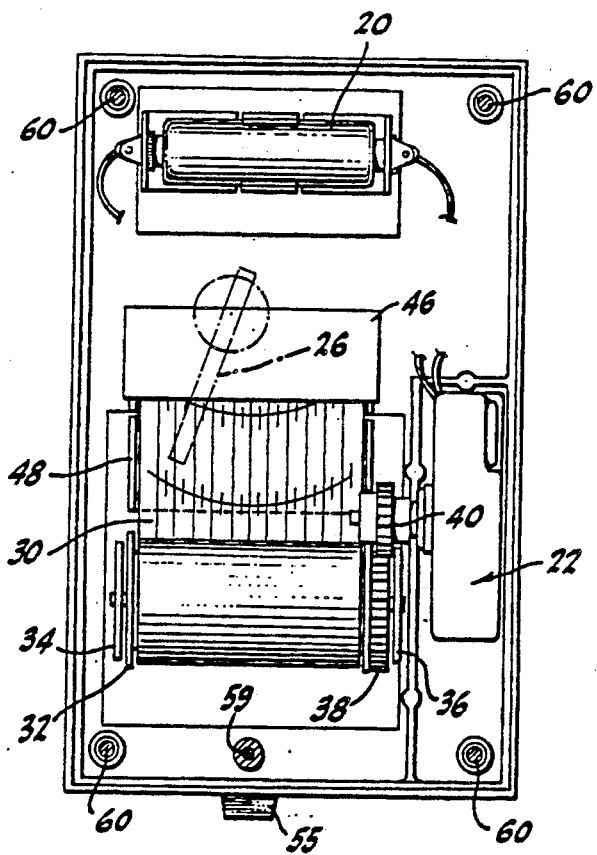
FIG. 4 is a sectional view taken along line 4—4 of FIG. 2.

The invention as a whole is shown in the drawings by reference character 10. The mechanism 10 includes as one of its elements a housing 12 having an exterior portion 14 and an interior portion 16, FIGS. 1 and 2. Housing 12 may be constructed of any material such as metal, plastic, wood and the like. With reference to FIG. 2, it may be observed that mechanism 10 is used in conjunction with a strip recorder 18 found on the interior 16 of housing 12. Strip recorder includes a battery pack 20 and a clock drive 22, best shown in FIG. 4, which is motivated by battery pack 20. In addition, a stylus apparatus 24 is depicted in FIG. 2 having a marking stylus 26. It should be noted that battery pack 20, clock mechanism 22, and stylus apparatus 24 are generally known in the prior art.

The mechanism 10 is further defined by holder 28 for recording strip 30 marked by stylus 26. Holder 28 may take the form a take-up roll 32 rotatably attached to ears 34 and 36, illustrated on FIG. 4. The end of take up roll 32 includes a gear wheel 40 which meshingly engages gear wheel of clock mechanism 22. It may be apparent that recording strip 30 unravels from recording strip source roll 42 which is found within compartment 44 at interior 16 of housing 12. Compartment 44 includes a removable door 46 for this purpose. Strip 30 passes over guide 48 which serves as a backing for the marking activity of stylus 26.

Figure 1:
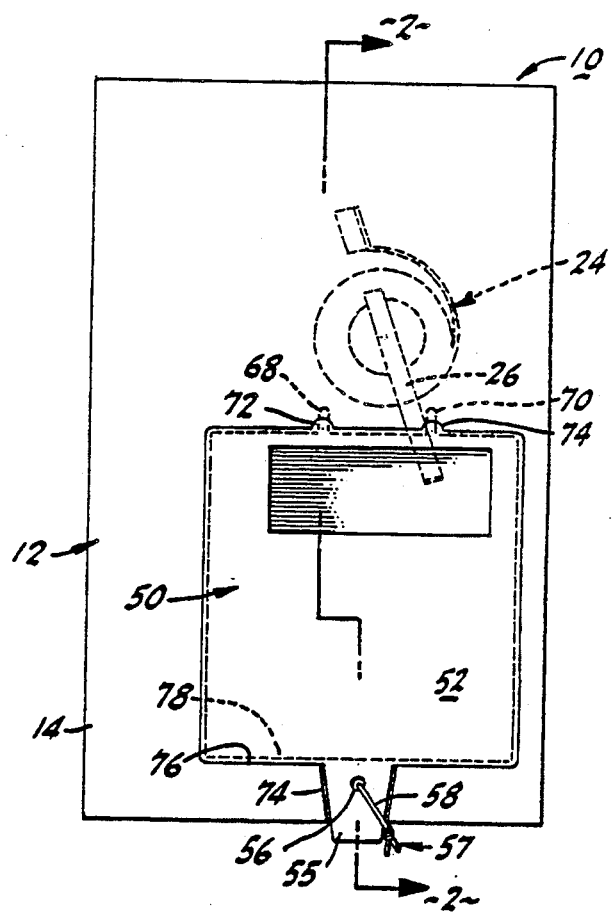
FIG. 1 is a rear elevational view of the mechanism of the present invention.
Figure 3:
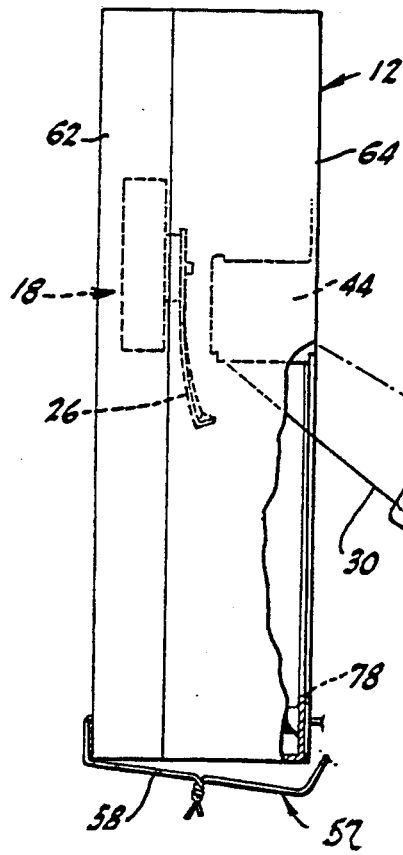
FIG. 3 is a side elevational view of the mechanism of the present invention with the plate element removed from the rear thereof.
Figure 3:
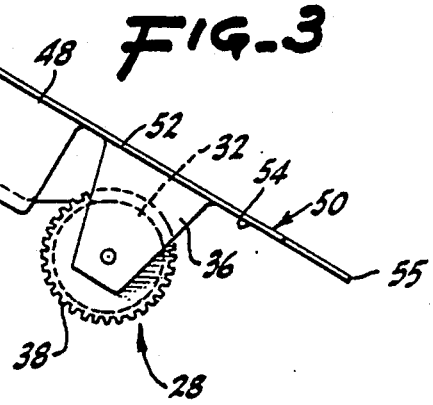

Referring now to FIGS. 1 and 3, it should be understood that mechanism 10 also includes an element or plate 50 which connects to recording strip holder 28. That is, ears 34 and 36 connect to element 50 or are integrally formed therewith. Guide 48 also connects to element 50, FIG. 3. Element 50 includes a exterior surface 52 and an interior surface 54. In the embodiment shown in FIGS. 1 and 3, element or plate 50 forms a portion of the exterior 14 of housing 12. Element 50 includes a tab 55 having an aperture 56 which aligns with opening 59 through housing 12. Sealing means 57, represented wire 58 would maintain the integrity of element 50 relative to housing 14 after the marking of recording strip 30 has initiated. In this regard, plurality of fasteners 60 hold portions 62 and 64 of housing 12 together. Removal of fasteners 60 permits access to the interior 16 of housing 12 for the purpose of repair or replacement of elements therewithin, including source r 42 for recording strip 30. Of course, sealing means 57 must be broken to gain access to interior 16 of housing 12 in this case also.

Figure 6:
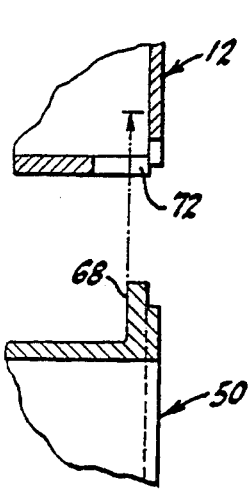
FIG. 6 is a sectional view taken along line 6—6 of FIG. 5.
Figure 5:
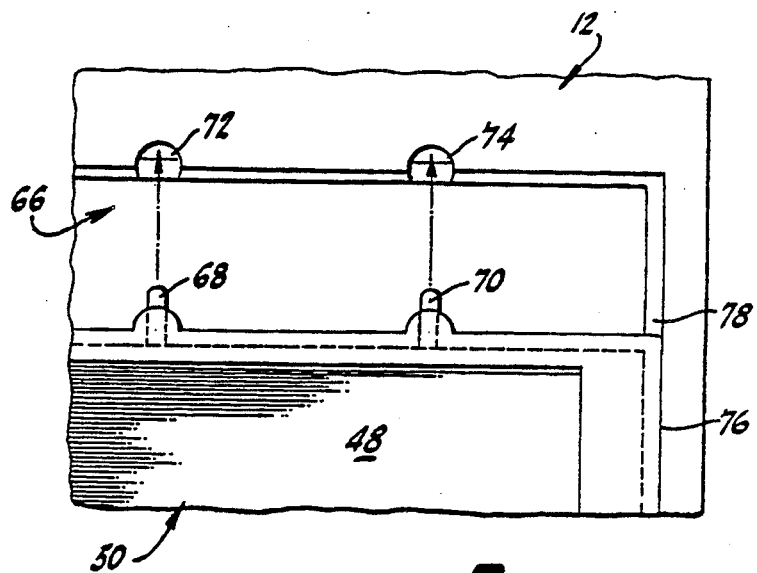
FIG. 5 is a partial top plan view of the rear of the present invention showing a portion of the apparatus employed to fix and detach the plate element from the remainder of the housing.

With reference to FIGS. 5 and 6, means 66 is depicated for fixing and removing element 50 relative to housing 12. Means 66 may take the form of stepped protuberances 68 and 70 which fit into cavities 72 and 74 respectively. Tab 55 lies in a channel 74 on the exterior of housing 12 when protuberances 68 and 70 are placed within cavities 70 and 72, respectively. Also, bottom edge 76 of element 50 rests on shoulder 78 of housing 12 at this time, FIG. 3

In operation, the user removes plurality of fasteners 60 to separate housing 12 into portions 62 and 64. Source roll 42 having a recording strip 30 thereupon is placed within compartment 44 by removing and replacing door 46. Recording strip is then lead over guide 48 and onto take up roller 32. Element 50 is then fixed to housing 14 by the use of means 66. At this time stylus 26 will touch strip 30 on the surface of guide 48, and gear wheel 38 of take-up roller 32 will engage gear wheel 40 of clock drive 22. Battery pack 20 is then activated, usually by removal of an electrically insulating strip, such that stylus apparatus 24 begins to operate. In the embodiment shown, apparatus 24 is employed to record temperature in the environment surrounding housing 12. Seal 57 is then place through apertures 56 and 59 of tab 55 and housing 12, respectively. After strip 30 has been marked by stylus 26, indicating a continuous record of an environmental condition such as temperature, the user would break seal means 57, remove element or plate 50 with guide 48 and holder 28 attached thereto outwardly from housing 12, without disturbing stylus 26. Gear 38 on take-up roll 32 would also simply disengage gear 40 of clock mechanism 22 by this outward movement of element 50. Strip 30 would then be removed from strip holder 28 for analysis. Element 50 may then be replaced into its position relative to housing 14 after reloading a source roll 42 and process may then be repeated, if reuse of mechanism 10 is desired.

While in the foregoing embodiments of the invention have been set forth in considerable detail for the purpose of making a complete disclosure of the invention it may be apparent to those of skill in the art that numerous changes may be made in such details without departing from the spirit and principles of the invention.

What is claimed is:

1. A mechanism for the disengagement of a strip record used in conjunction with a clock drive for advancing a recording strip from a source, including an environmental measuring device linked to a stylus for marking the recording strip comprising:
    a. a housing having an interior and an exterior portion, the stylus positioned within said interior portion of said housing;
    b. a holder for the recording strip marked by the stylus, said holder including a roller capable of being linked to the clock drive;
    c. an element connected to said recording strip holder;
    d. means for fixing said element relative to said housing such that said connected recording strip holder lies at the interior portion of said housing, the recording strip and the stylus are brought together to permit marking of the recording strip by the stylus, and said roller links to the clock drive for movement therewith;
    e. means for removing said element and connected recording strip holder relative to said housing by movement of the recording strip away from the stylus to preclude marking of the recording strip by the stylus, and to preclude linkage of the roller and the clock drive.

2. The mechanism of claim 1 in which said roller is rotatable on an axis.

3. The mechanism of claim 1 in which said element comprises a plate, said plate forming a portion of said housing.

4. The mechanism of claim 3 in which said plate further comprises means for sealing said plate to the housing said sealing means including an aperture through said plate.

5. The mechanism of claim 1 which further includes a guide for positioning the recording strip relative to the stylus to permit marking of the recording strip by the stylus, said guide being connected to said element, said guide lying intermediate the recording strip source and said holder for the recording strip.

6. The mechanism of claim 2 in which said roller includes a gear wheel engaging the clock drive, said gear wheel being disengaged when said means for removing said element is activated.

* * * * *